(12) United States Patent
Zhang et al.

(10) Patent No.: US 7,715,652 B1
(45) Date of Patent: May 11, 2010

(54) METHOD AND/OR APPARATUS FOR DETECTING HOMOGENEITY OF BLOCKS IN AN IMAGE PROCESSING SYSTEM

(75) Inventors: Huipin Zhang, Santa Clara, CA (US); Jiangtao Wen, La Jolla, CA (US); José R. Alvarez, Sunnyvale, CA (US)

(73) Assignee: Maxim Integrated Products, Sunnyvale, CA (US)

( * ) Notice: Subject to any disclaimer, the term of this patent is extended or adjusted under 35 U.S.C. 154(b) by 1267 days.

(21) Appl. No.: 11/232,459

(22) Filed: Sep. 21, 2005

(51) Int. Cl. *G06K 9/36* (2006.01)
(52) U.S. Cl. ...................... 382/286; 382/224
(58) Field of Classification Search ................ 382/286, 382/205, 224, 239, 243
See application file for complete search history.

(56) References Cited

U.S. PATENT DOCUMENTS 5,555,033 A * 9/1996 Bazzaz ...................... 348/699
6,766,037 B1 * 7/2004 Le et al. ...................... 382/107

OTHER PUBLICATIONS

K.P. Kim et al., Fast INTER Mode Selection, Document JVT-I020, Joint Video Team (JVT) of ISO/IEC MPEG & ITU-T VCEG, (ISO/IEC JTC1/SC29/WG11 and ITU-T SG16 Q.6), 9$^{th}$ Meeting: San Diego, US, Sep. 2-5, 2003.

* cited by examiner

*Primary Examiner*—Phuoc Tran
(74) *Attorney, Agent, or Firm*—Christopher P. Maiorana, PC

(57) ABSTRACT

An apparatus comprising a first circuit and a second circuit. The first circuit may be configured to (i) receive an image data stream comprising a plurality of frames each having a plurality of regions, (ii) select a particular region to be marked as being homogeneous or not homogeneous, and (iii) determine whether a group of neighboring regions to the selected region are qualified or not qualified. The second circuit may be configured to mark the selected region as being homogeneous when one or more of the adjacent regions are (i) qualified and (ii) previously marked as being homogeneous.

19 Claims, 17 Drawing Sheets

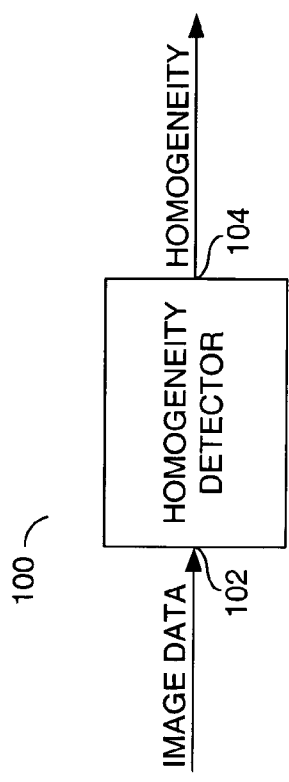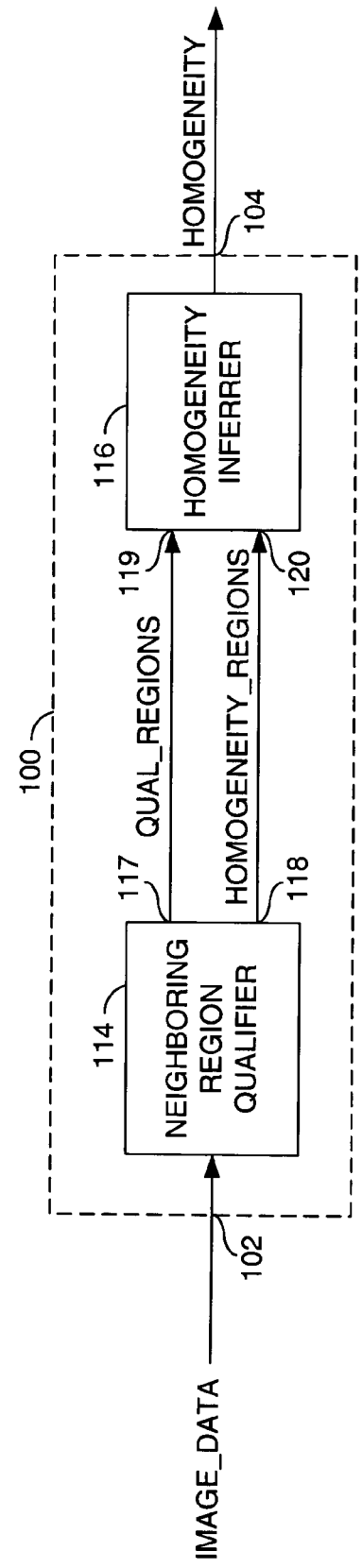

(A)  (B)  (C)

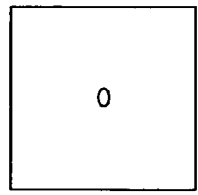 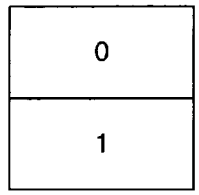 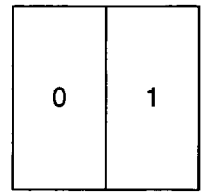 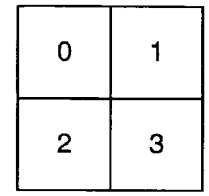
16x16  16x8  8x16  8x8
FIG. 22
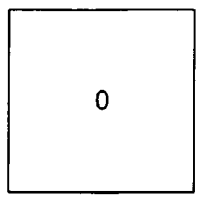 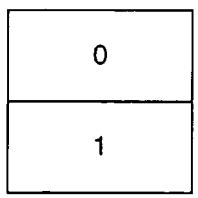 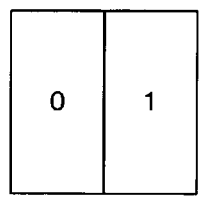 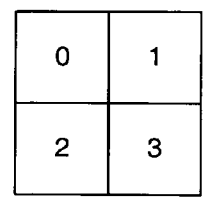
8x8  8x4  4x8  4x4
FIG. 23

METHOD AND/OR APPARATUS FOR DETECTING HOMOGENEITY OF BLOCKS IN AN IMAGE PROCESSING SYSTEM

FIELD OF THE INVENTION

The present invention relates to image processing generally and, more particularly, to a method and/or apparatus for detecting the homogeneity of each of a number of blocks in an image processing system.

BACKGROUND OF THE INVENTION

Conventional block-based image processing (such as filtering, segmentation and compression) usually involves determining the homogeneity of the various blocks within the image data stream. A homogeneous block has no strong edge or no high frequency texture. A non-homogeneous block either has strong edges or has many high frequency textures.

The homogeneity of blocks can be used to select different processing approaches. In particular, Motion Estimation (ME) and/or Motion Compensation (MC) in video compression is often performed with different block partitions for homogeneous Macro-Blocks (MB) and non-homogeneous MBs. Since homogenous blocks use less processing resources, efficient and accurate detection of the homogeneity of blocks is important in many image processing applications. In conventional implementations, the homogeneity of a block is often detected in terms of the pixel-by-pixel texture information of the block. If the edge strength in a block is below a threshold, the block is considered homogeneous. Otherwise, the block is considered non-homogeneous.

Linear or non-linear filters are used for edge strength detection. Linear or non-linear filters are typically computationally expensive in hardware implementations and some software implementations. The computational complexity is determined by the filter, the filter kernel size, the image resolution, etc.

It would be desirable to provide a method and/or apparatus for detecting the homogeneity of a number of blocks in an image processing system that reduces the amount of computational resources when compared with using only linear or non-linear filters.

SUMMARY OF THE INVENTION

The present invention concerns an apparatus comprising a first circuit and a second circuit. The first circuit may be configured to (i) receive an image data stream comprising a plurality of frames each having a plurality of regions, (ii) select a particular region to be marked as being homogeneous or not homogeneous, and (iii) determine whether a group of neighboring regions to the selected block are qualified or not qualified. The second circuit may be configured to mark the selected region as being homogeneous when one or more of the adjacent regions are (i) qualified and (ii) previously marked as being homogeneous.

The objects, features and advantages of the present invention include providing a method and/or apparatus for detecting the homogeneity of a number of blocks in an image processing system that may (i) reduce and/or eliminate the computational complexity created by a filter and/or (ii) be implemented in hardware and/or software.

BRIEF DESCRIPTION OF THE DRAWINGS

These and other objects, features and advantages of the present invention will be apparent from the following detailed description and the appended claims and drawings in which:

FIG. 2 is a block diagram of a homogeneity detection system;

FIG. 3 is a block diagram of a homogeneity detection system using inference from neighboring blocks;

FIG. 22 is a diagram illustrating partitioning of a macroblock; and

FIG. 23 is a diagram illustrating sub-macroblock partitioning.

DETAILED DESCRIPTION OF THE PREFERRED EMBODIMENTS

Figure 1:
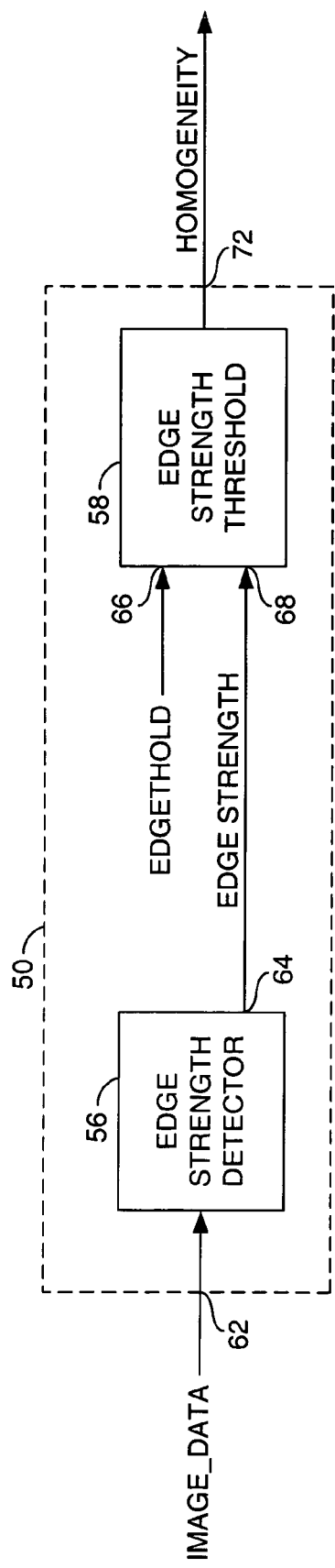
FIG. 1 is a block diagram of a homogeneity detection system using edge detection.

Referring to FIG. 1, a block diagram of a detection system 50 using edge detection is shown. The detection system 50 comprises a block (or circuit) 56 and a block (or circuit) 58. The block 56 comprises an edge strength detector circuit. The block 58 comprises an edge strength threshold circuit. The edge detector circuit 56 may have an input 62 that receives a signal (e.g., IMAGE_DATA) and may have an output 64 that may present a signal (e.g., EDGE_STRENGTH). The signal IMAGE_DATA may be a digital signal comprising a plurality of frames. The signal IMAGE_DATA may be a progressive signal or an interlaced signal. Each of the frames of the signal IMAGE_DATA may include a plurality of blocks. Each of the frames of the signal IMAGE_DATA may have one or more regions each formed by a plurality of blocks. The edge strength thresholding circuit 58 may have an input 66 that may receive a signal (e.g., EDGETHOLD). The edge strength thresholding circuit 58 may have an input 68 that may receive the signal EDGE_STRENGTH.

The edge strength threshold circuit 58 may have an output 72 that may present a signal (e.g., HOMOGENEITY) that indicates whether each block in the signal IMAGE_DATA is homogenous or not. The edge detector circuit 56 may apply edge strength detection to each block. The edge strength detector circuit 56 may generate the signal EDGE_STRENGTH that holds a value for each of the block. The signal EDGE_STRENGTH may be calculated via linear or non-linear filtering. The edge strength threshold circuit 58 generally compares the signal EDGE_STRENGTH with the signal EDGETHOLD to determine the homogeneity of each of the blocks. The edge strength threshold circuit 58 flags each block as being either homogeneous or non-homogeneous. For example, if the edge strength of a particular block is below the specified threshold, the block may be flagged (or marked) as homogeneous. Otherwise, the particular block may be flagged as non-homogeneous. The signal HOMOGENEITY generally comprises a number of flag values. Each flag value indicates whether a particular block is homogeneous or non-homogeneous.

Referring to FIG. 2, a block diagram of a homogeneity detection system 100 is shown. The homogeneity detection system 100 may have an input 102 that may receive a signal (e.g., IMAGE_DATA) and an output 104 that may present a signal (e.g., HOMOGENEITY). The signal IMAGE_DATA may include source image data that is partitioned into blocks. For example, the images may be partitioned into blocks having sizes 8×8, 16×16, etc. Each block may be detected and flagged as a homogeneous block or a non-homogeneous block. The signal HOMOGENEITY may include (i) a binary value of H for homogeneous blocks or (ii) a binary value N for non-homogeneous blocks. The particular type of flagging may be varied to meet the design criteria of a particular implementation.

In contrast to approaches that directly determine the homogeneity of each of the blocks using pixel-by-pixel texture information, the present invention may provide an approach that may be used to infer the homogeneity of a particular block using the immediate neighbors (e.g., adjacent blocks) of the particular block. The homogeneity of the neighboring blocks may be previously known or may be detected (or calculated) using various conventional approaches. For example, the circuit 50 described in FIG. 1 may be used to perform such a calculation. Alternately, the frequency information of the neighboring blocks may be analyzed. The present invention may also be adapted to infer the homogeneity of a particular region or structure that may include a plurality of blocks. The shape and/or size of a particular region may be varied to meet the design criteria of a particular implementation. For example, a non-rectangular region may be implemented.

The present invention may use the correlation of the homogeneity of neighboring blocks (or regions) in natural images to reduce the overall processing needed to determine the homogeneity of all of the blocks (or regions). For example, if one of a number of adjacent blocks to a particular block is homogeneous, the probability that the particular block is also homogeneous may be high. The probability of the particular block being homogeneous increases if more than one of the neighboring blocks are homogeneous.

The present invention may be used to implement homogeneity detection of blocks based on an inference from neighboring blocks. In one example, the inference may be based on binary comparisons. The present invention may provide an implementation simple enough for both a software implementation and/or a hardware implementation.

Referring to FIG. 3, a block diagram of a detection system 100. The homogeneity detection system 100 generally comprises a block (or circuit) 114 and a block (or circuit) 116. The block 114 may be implemented as a neighboring region qualifier circuit. The block 116 may be implemented as a homogeneity inferrer circuit. The signal IMAGE_DATA may be a source signal comprising a series of frames. Each of the frames may be progressive or interlaced. Interlaced frames are discussed in more detail in connection with FIG. 17. The neighboring region qualifier 114 may have an output 118 that presents a signal (e.g., HOMOGENEITY_REGIONS) to an input 120 of the homogeneity inferrer 116. The neighboring region qualifier 114 may also have an output 117 that may present a signal (e.g., QUAL_REGIONS) to an input 119 of the homogeneity inferrer 116. The homogeneity inferrer 116 may present the signal HOMOGENEITY that indicates whether each block in the signal IMAGE_DATA is homogeneous or not.

For each block within an image, the neighboring region qualifier 114 may (i) qualify the chosen neighboring blocks for homogeneity detection on the signal QUAL_REGIONS and (ii) present a flag indicating the homogeneity of the neighboring blocks on the signal HOMOGENEITY_REGIONS. If a neighboring block does not qualify for detecting the homogeneity of the selected block, the neighboring block is normally assigned a first homogeneity value (e.g., N). A process for qualifying neighboring blocks will be discussed in more detail in connection with FIG. 8. The homogeneity inferrer 116 generally detects the homogeneity of a particular block by inferring the homogeneity of neighboring blocks. The homogeneity of a particular block may be inferred from one or more neighboring blocks, depending on the implementation complexity and result accuracy of the particular detection system used. In general, a particular block is flagged as homogeneous if the chosen neighboring blocks are homogenous.

Figure 4:
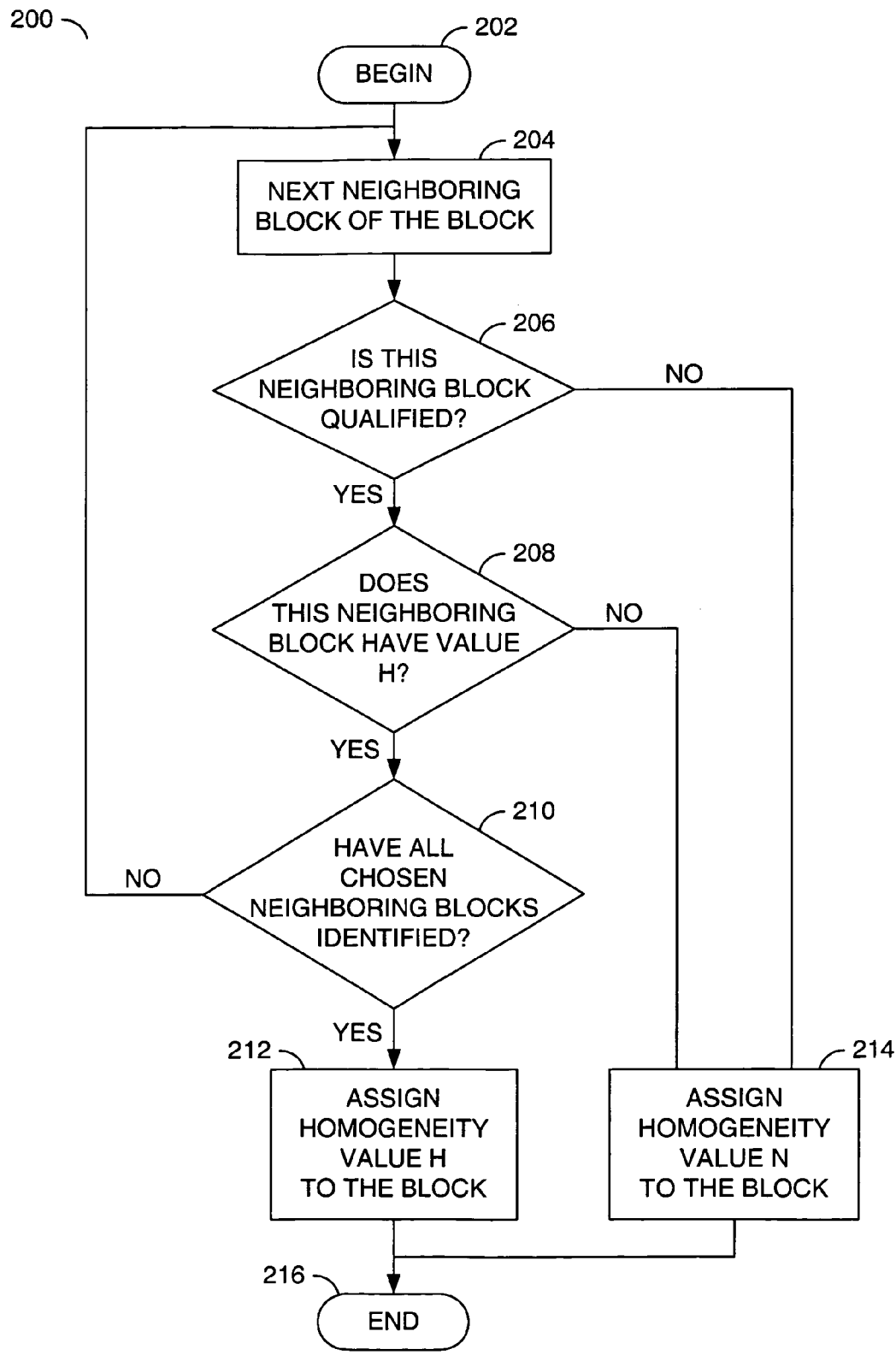
FIG. 4 is a flow diagram for homogeneity detection for a block using an inference from neighboring blocks.

Referring to FIG. 4, a method 200 for detecting the homogeneity of a block is shown. The method 200 infers the homogeneity of a particular block based on the characteristics of the chosen neighboring blocks of the particular block. The homogeneity of the neighboring blocks is normally known prior to implementing the method 200. In particular, other systems may be used to perform homogeneity tests on the neighboring blocks. The method 200 generally comprises a state (or step) 202, a state (or step) 204, a decision state (or step) 206, a decision state (or step) 208, a decision state (or step) 210, a state (or step) 212, a state (or step) 214 and a state (or step) 216. The state 202 generally comprises a start state. The state 204 may look to the next neighboring block of the particular block. The state 206 may determine if the chosen neighboring block is qualified or not. The state 206 may determine whether the chosen neighboring block is qualified by the following conditions. Given a block A of size m×n, a block B of size p×q may be considered (and marked as) a qualified neighboring block of A if a) the block B is inside the source image (e.g., basic condition), and
b) p>=m and q>=n (e.g., size condition), and
c) block A and block B share a block boundary (e.g., boundary condition), and
d) the length of the sharing boundary is m, in the case when the shared boundary is horizontal; or the length of the shared boundary is n, in the case when the shared boundary is vertical (e.g., boundary length condition).

If the chosen neighboring block is not qualified, the method 200 moves to the state 214. The state 214 may assign a homogeneity value (e.g., N) to the current block. Next, the method 200 moves to the state 216, and the homogeneity detection process 200 terminates. If the chosen neighboring block is qualified, the method 200 moves to the state 208. The state 208 may test the homogeneity of the chosen neighboring block. If the chosen neighboring block is not homogeneous (e.g., the neighboring block has a homogeneity value of N), the method 200 moves to the state 214. The state 214 may assign the homogeneity value (e.g., N) to the particular block and the homogeneity detection process 200 ends. If the chosen neighboring block is homogeneous (e.g., a homogeneity value of H), then the method 200 moves to the decision state 210. The decision state 210 may test whether all chosen neighboring blocks have been examined. If there is still a chosen neighbor to be examined, the method 200 moves back to the state 204 to select the next neighboring block of the particular block. If all of the neighboring blocks have been examined, the method 200 moves to the state 212. In the state 212, the homogeneity value H may be assigned to the block.

Figure 5:
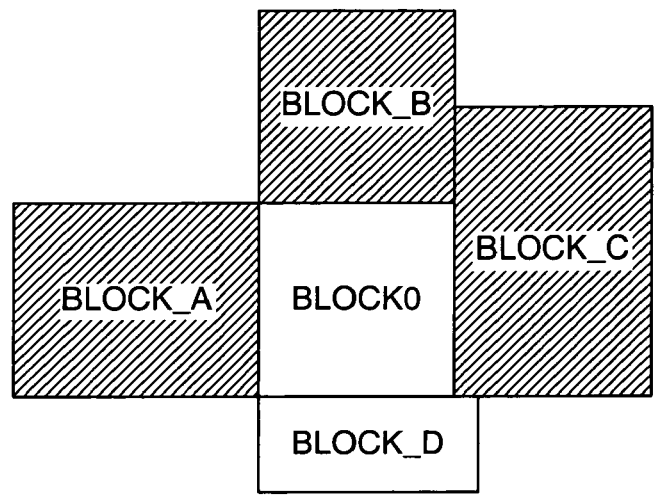
FIG. 5 is a diagram illustrating a block and a number of neighboring blocks in a first arrangement.

Referring to FIG. 5, a diagram illustrating, the particular block to be analyzed (e.g., BLOCK0) and a number of neighboring blocks in a first arrangement is shown. In general, a BLOCK_A, a BLOCK_B and a BLOCK_C are neighboring blocks to the BLOCK0. The BLOCK_D may be adjacent to the BLOCK0, but may not be qualified as a neighboring block to the BLOCK0 based on the conditions stated in state 206 in FIG. 4. In particular, the BLOCK_D has a smaller vertical size than the BLOCK0 (e.g., the size condition of the state 206 is not met).

Figure 6:
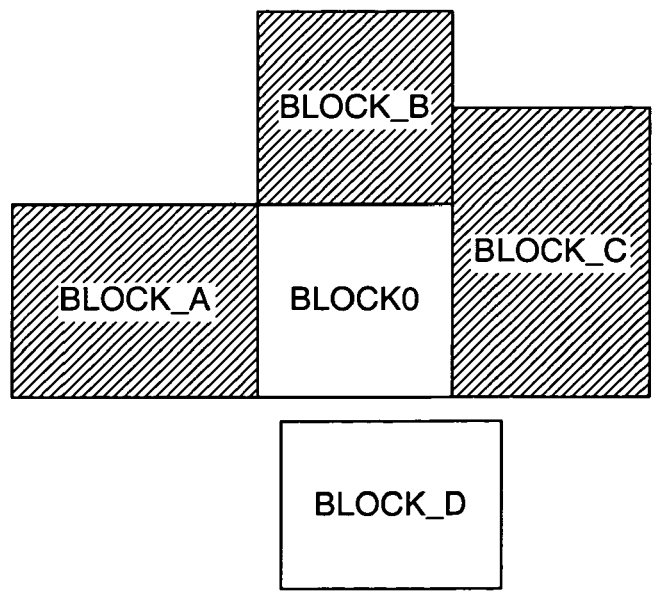
FIG. 6 is a diagram illustrating a block and a number of neighboring blocks in a second arrangement.

Referring to FIG. 6, a diagram illustrating the particular block to be analyzed (e.g., BLOCK0) and a number of blocks in a second arrangement is shown. In general, the BLOCK_A, the BLOCK_B and the BLOCK_C are neighboring blocks of the BLOCK0. The BLOCK_D may not be qualified as a neighboring block to the BLOCK0 based on the conditions stated in the state 206 in FIG. 4. In particular, the BLOCK_D does not share a block boundary with the BLOCK0 (e.g. the boundary condition of state 206 is not met).

Figure 7:
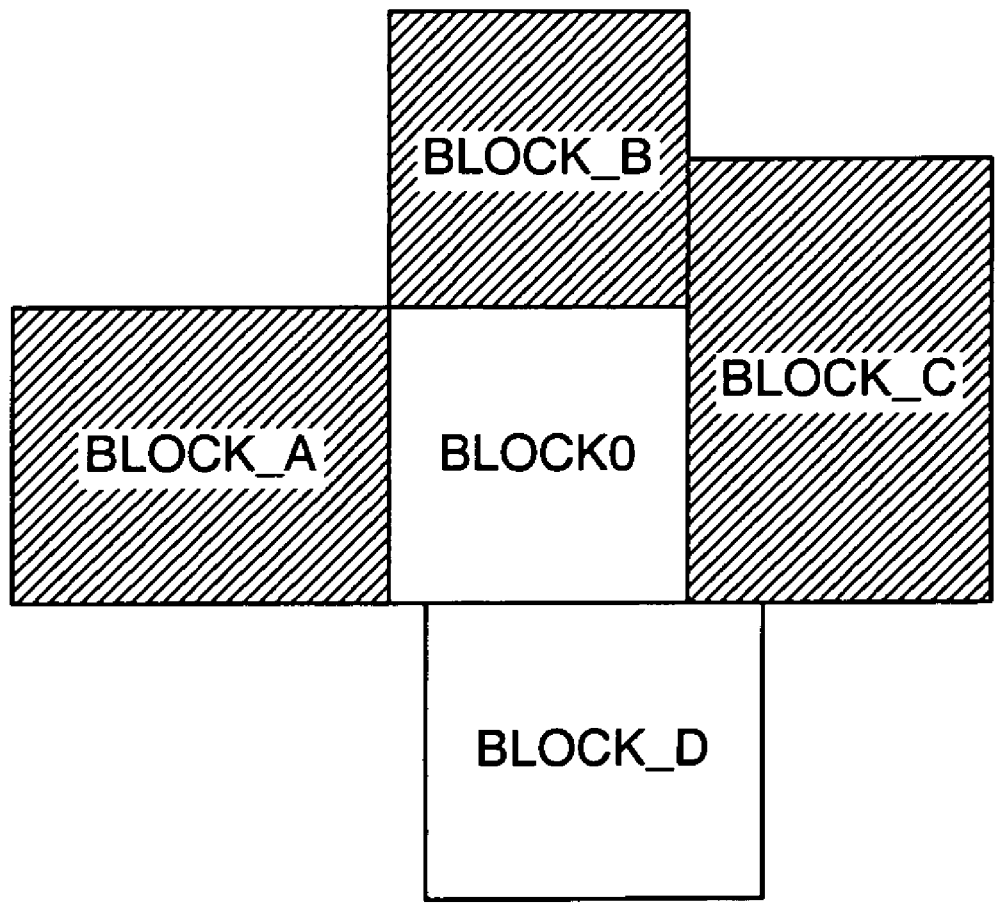
FIG. 7 is a diagram illustrating a block and a number of neighboring blocks in a third arrangement.

Referring to FIG. 7, a diagram illustrating the particular block to be analyzed (e.g., BLOCK0) and a number of neighboring blocks in a third arrangement is shown. In general, the BLOCK_A, the BLOCK_B and the BLOCK_C are neighboring blocks of the BLOCK0. The BLOCK_D may not be qualified as a neighboring block to the BLOCK0 based on the conditions stated in the state 206 in FIG. 4. In particular, the length of the sharing boundary between the BLOCK_D and the BLOCK0 is smaller than the horizontal size of the BLOCK0 (e.g., the boundary length condition of state 206 is not met).

Figure 8:
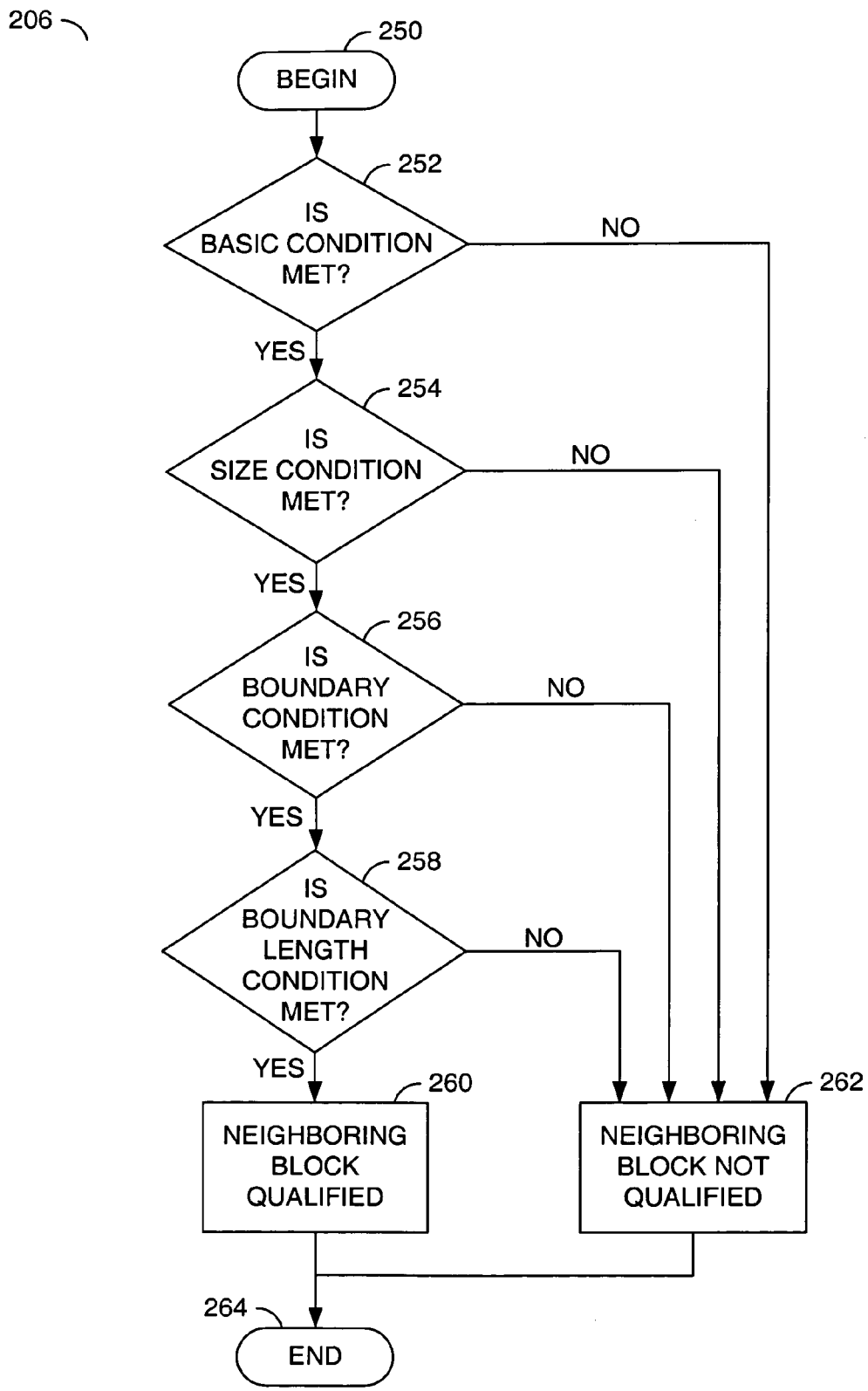
FIG. 8 is a flow diagram for detecting whether a block B is a qualified neighboring block of a block A.

Referring to FIG. 8, a detailed diagram of the state 206 is shown. The state 206 normally detects whether first block (e.g., BLOCK_B) is a qualified neighboring block of a second block (e.g., BLOCK_A). The state 206 generally comprises a state (or step) 250, a decision state (or step) 252, a decision state (or step) 254, a decision state (or step) 256, a decision state (or step) 258, a state (or step) 260, a state (or step) 262 and a state (or step) 264. The state 250 generally comprises a start state. The decision state 252 may determine whether a basic condition is met. If the basic condition is met, the method 250 moves to the decision state 254. The decision state 254 may determine whether a size condition is met. If the size condition is met, the method 250 moves to the decision state 256. The decision state 256 may determine whether a boundary condition is met. If the boundary condition is met, the method 250 moves to the decision state 258. The decision state 258 may determine whether a boundary length condition is met. If the boundary length condition is met, the method moves to step 260. The state 260 may designate the BLOCK_B as a qualified neighboring block of BLOCK_A. However, if any of the four tests fails (e.g., the decision state 252, the decision state 254, the decision state 256, and the decision state 258), the method 250 moves to step 262. The state 262 does not designate the BLOCK_B as a qualified neighboring block of BLOCK_A.

In general, a block may have at most four qualified neighboring blocks. Any one of the neighboring blocks may share (i) a left boundary of the block, (ii) a top boundary of the block, (iii) a right boundary of the block and (iv) a bottom boundary of the block. The left boundary of the block may be defined as a left neighbor. The top boundary of the block may be defined as a top neighbor. The right boundary of the block may be defined as a right neighbor. The bottom boundary of the block may be defined as a bottom neighbor. The four neighbors may not necessarily be present for every block. For example, a block at the right most side of an image will not have a right boundary that is shared by another block.

Figure 9:
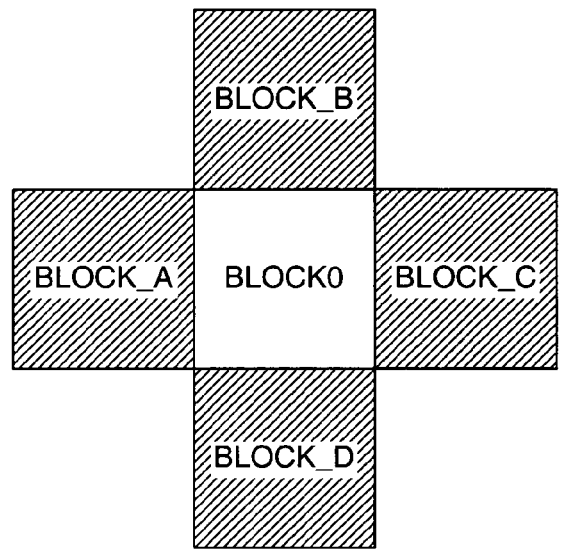
FIG. 9 is a diagram illustrating a block and a number of neighboring blocks in a fourth arrangement.

Referring to FIG. 9, a diagram illustrating a block to be analyzed (e.g., BLOCK0) and a number of neighboring blocks in a fourth arrangement is shown. A typical scenario may involve a left neighbor BLOCK_A, a top neighbor BLOCK_B, a right neighbor BLOCK_C and a bottom neighbor BLOCK_D having the same size as the BLOCK0.

Figure 10:
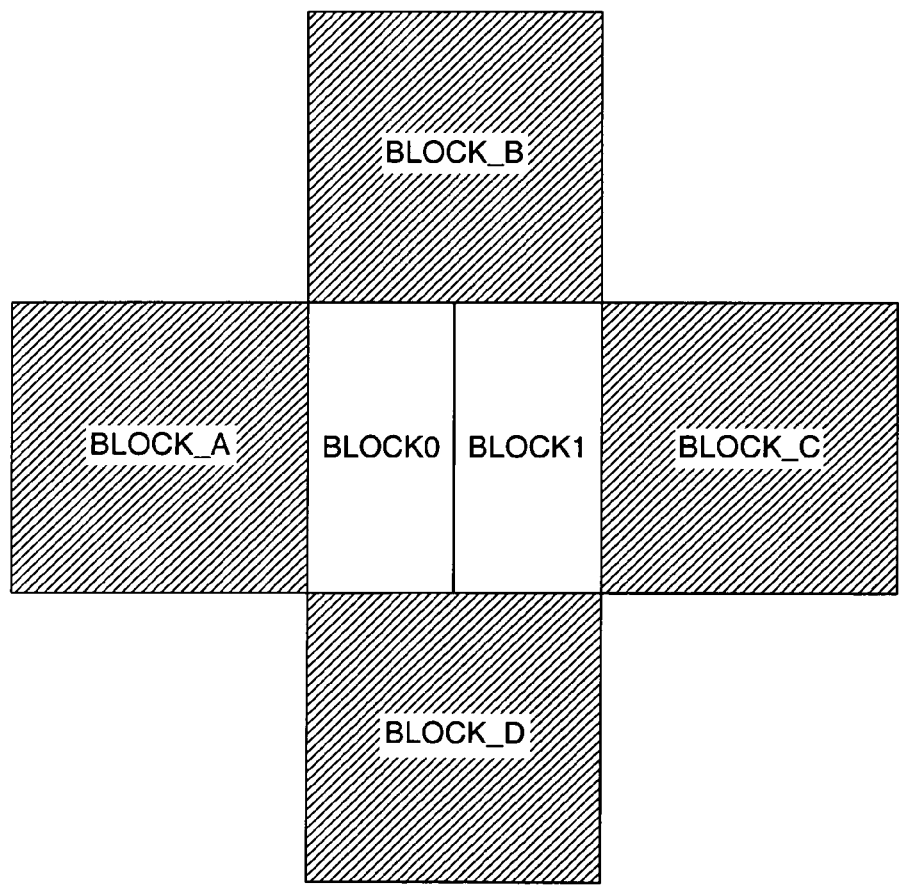
FIG. 10 is a diagram illustrating two blocks and a number of neighboring blocks in the fourth arrangement.

Referring to FIG. 10, a diagram illustrating two blocks to be analyzed (e.g., BLOCK0 and BLOCK1) and a number of neighboring blocks in a fourth arrangement is shown. A typical scenario may include a BLOCK_A, a BLOCK_B and a BLOCK_D as defining a respective left neighbor, top neighbor and bottom neighbor of BLOCK0. A typical scenario may also involve the BLOCK_B, the BLOCK_C, and the BLOCK_D defining a respective top neighbor, right neighbor and bottom neighbor of a BLOCK1.

Figure 11:
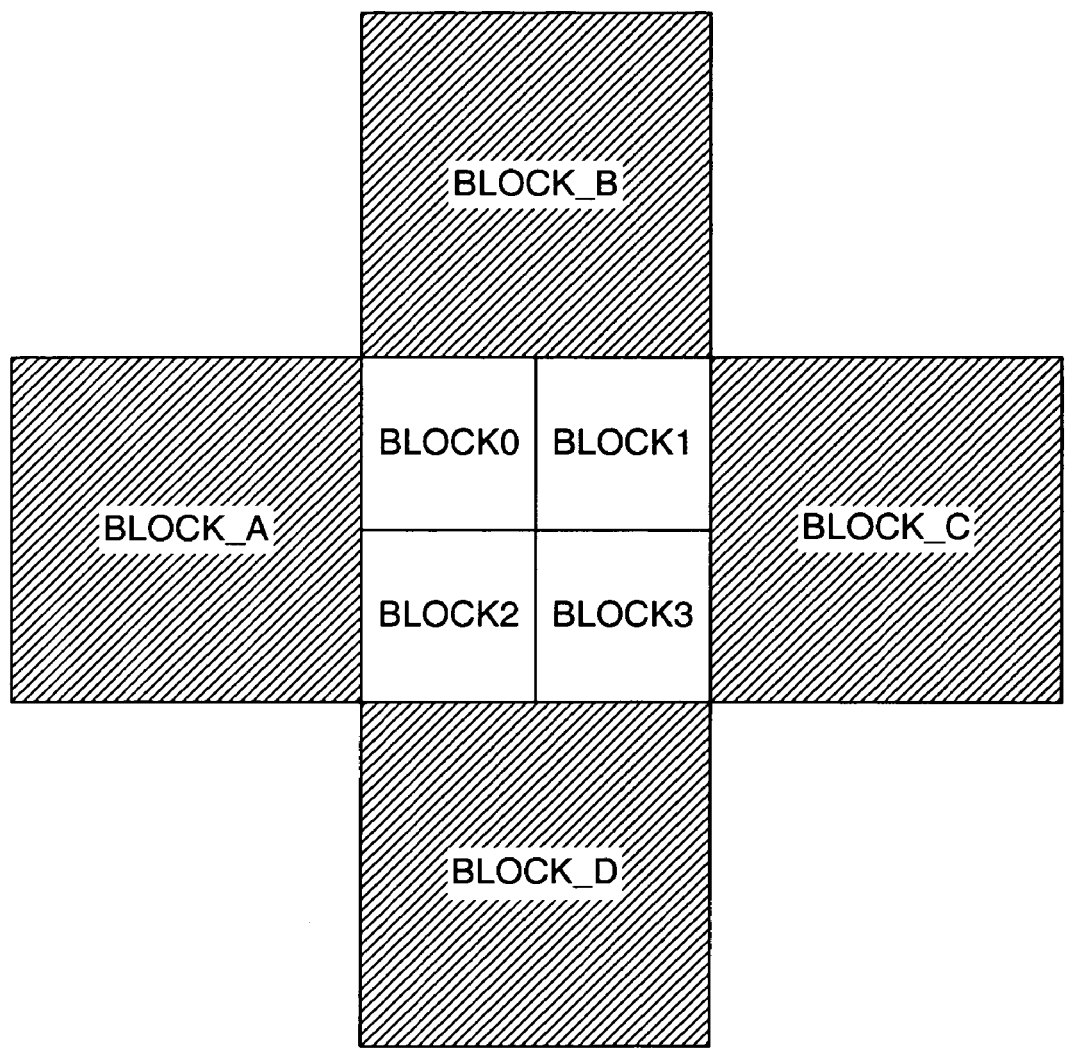
FIG. 11 is a diagram illustrating four blocks and a number of neighboring blocks in the fourth arrangement.

Referring to FIG. 11, a diagram illustrating four blocks to be analyzed (e.g., BLOCK0, BLOCK1, BLOCK2 and BLOCK3) and a number of neighboring blocks in the fourth arrangement is shown. A typical scenario may involve (i) BLOCK_A as the left neighbor to BLOCK0 and BLOCK2, (ii) BLOCK_B as the top neighbor to BLOCK0 and BLOCK1, (iii) BLOCK_C as the right neighbor to BLOCK1 and BLOCK3, and (iv) BLOCK_D as the bottom neighbor to BLOCK2 and BLOCK3.

As noted with the homogeneity inferrer 116 in connection with FIG. 3, the homogeneity inferrer 116 may use one neighbor, two neighbors, three neighbors or four neighbors to detect the homogeneity of a particular block. The number of neighbors used to determine an inference is dependent on the specifications related to the particular block complexity of the implementation, and the accuracy of the results that are needed. The neighbor blocks are generally determined in advance.

Figure 12:
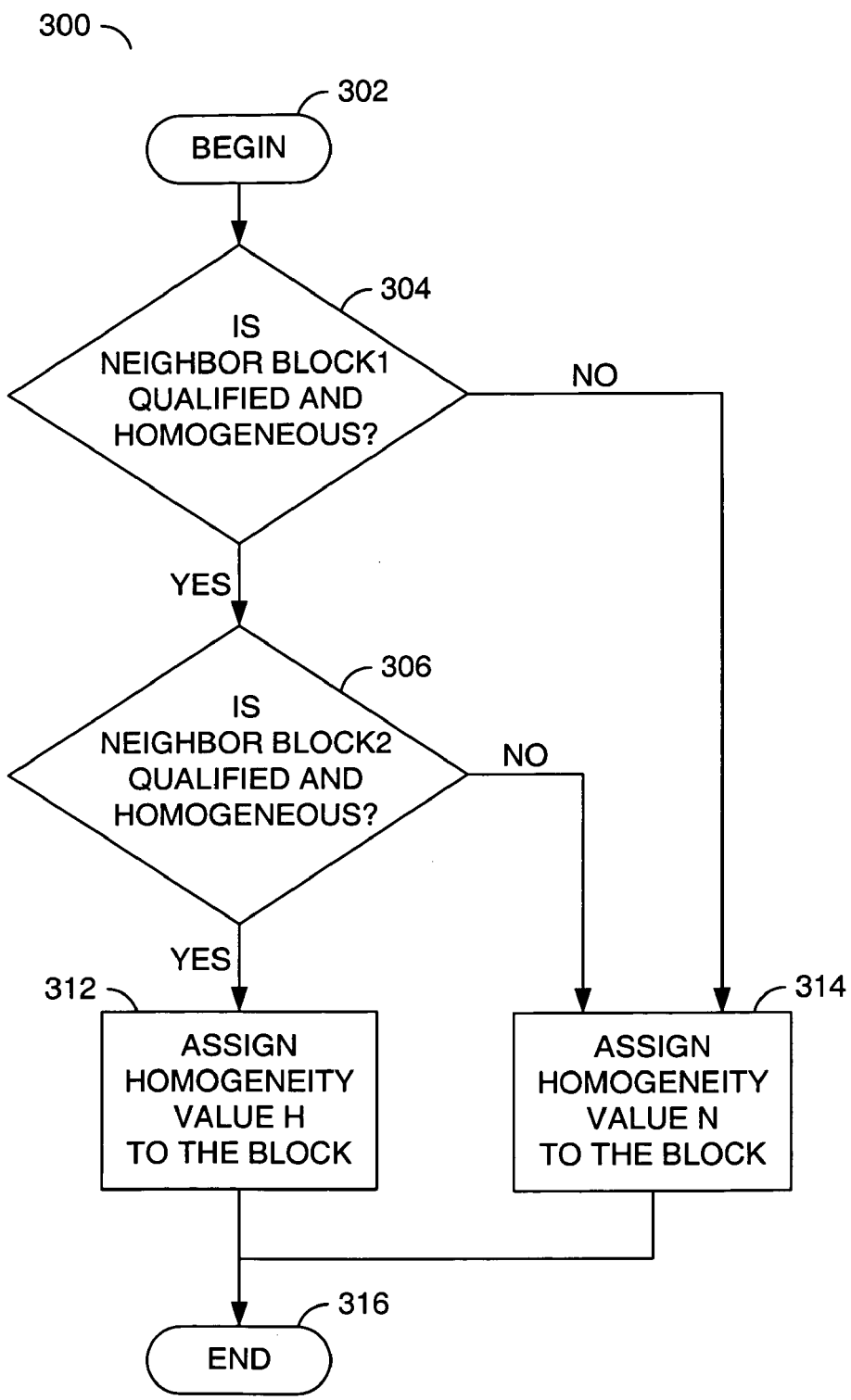
FIG. 12 is a flow diagram for detecting the homogeneity of a block using a two-neighbor inference method.

Referring to FIG. 12, a method 300 for detecting the homogeneity of a block using a two-neighbor inference method 300 is shown. In a one-neighbor-inference approach, a block is flagged as homogeneous if one or more pre-determined neighboring blocks are both qualified and both homogeneous. In a two-neighbor-inference approach, a block is flagged as homogeneous if two pre-determined neighboring blocks are both qualified and both homogeneous. The method 300 generally comprises two sequential tests on the qualifications and the homogeneity of the pre-determined one or more neighboring blocks of a particular block being analyzed. If any of the two tests shows that a neighboring block is non-qualified or non-homogeneous, then the remaining tests, if any, are skipped, and a homogeneity value (e.g., N) may be assigned to the particular block and the method 300 ends. If the two tests show that the one or more neighboring blocks are both qualified and both homogeneous, then a homogeneity value (e.g., H) is assigned to the particular block.

The method 300 generally comprises a state (or step) 302, a decision state (or step) 304, a decision state (or step) 306, a state (or step) 312, a state (or step) 314 and a state (or step) 316. The state 302 generally comprises a start state. The decision state 304 may determine if a neighbor BLOCK1 is qualified and homogeneous. If the neighbor BLOCK1 is not either qualified or homogeneous, the method 300 moves to the state 314. The state 314 may assign to the BLOCK1 homogeneity value of (e.g., N) and the method 300 terminates. If the neighbor BLOCK1 is qualified and homogeneous, the method 300 moves to the decision state 306. The decision state 306 may determine if a neighbor BLOCK2 is qualified and homogeneous. In a one-neighbor system, the state 306 may be bypassed. If the neighbor BLOCK2 is not either qualified or homogeneous, the method moves to the state 314. The state 314 may assign the BLOCK2 a homogeneity value (e.g., N) and the method 300 terminates. If the neighbor BLOCK2 is qualified and homogeneous, the method 300 moves to the state 312. The state 312 may assign a homogeneity value (e.g., H) to the particular block.

Figure 13:
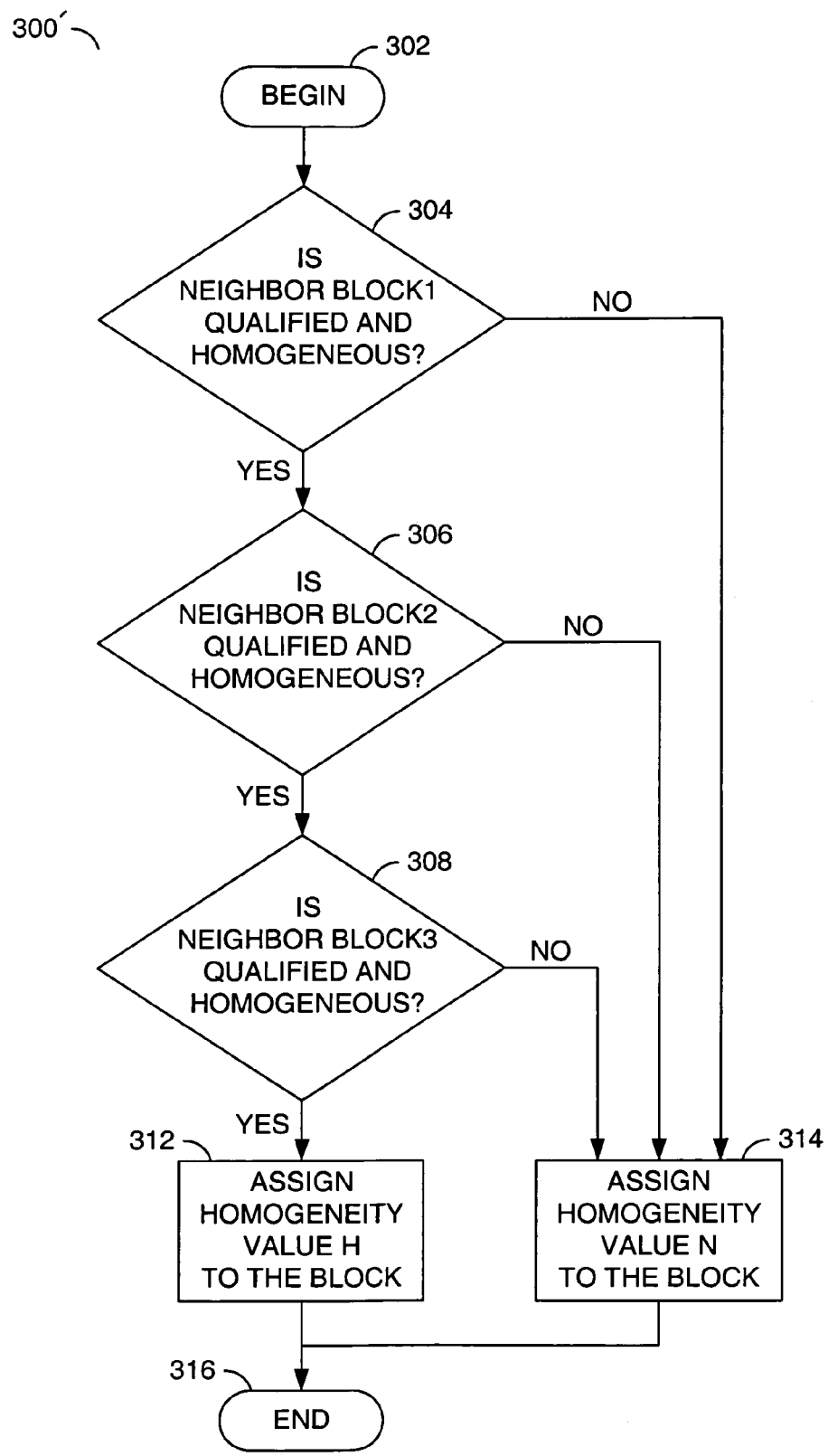
FIG. 13 is a flow diagram for detecting the homogeneity of a block using a three-neighboring inference method.

Referring to FIG. 13, a method 300' for detecting the homogeneity of a block to be analyzed using a three-neighboring inference system is shown. In the three-neighbor-inference method 300', a block is marked as homogeneous if the three pre-determined neighboring blocks are all qualified and all homogeneous. The method 300' comprises three sequential tests on the qualifications and the homogeneity of the pre-determined three neighboring blocks of the block to be analyzed. If any of the three tests shows that a neighboring block is non-qualified or non-homogeneous, then the remaining tests (if any) are skipped and a homogeneity value (e.g., N) may be assigned to the block and the method 300' ends. If the three tests show that the three neighboring blocks are all qualified and all homogeneous, then a homogeneity value (e.g., H) may be assigned to the particular block and the method 300' ends.

The state 302 generally comprises a start state. The decision state 304 determines if a neighbor BLOCK1 is qualified and homogeneous. If the neighbor BLOCK1 is not either qualified or homogeneous, the method 300' moves to the state 314. The state 314 may assign to the BLOCK1 the homogeneity value of N and the method 300' terminates. If the neighbor BLOCK1 is qualified and homogeneous, the method 300' moves to the decision state 306. The decision state 306 may determine if a neighbor BLOCK2 is qualified and homogeneous. If the neighbor BLOCK2 is not either qualified or homogeneous, the method 300' moves to the state 314. The state 314 may assign to the BLOCK2 a homogeneity value (e.g., N) and the method 300' terminates. If the neighbor block2 is qualified and homogeneous, the method 300' moves to the state 308. The decision state 308 may determine if a neighbor BLOCK3 is qualified and homogeneous. If the neighbor BLOCK3 is not either qualified or homogeneous, the method 300' moves to the state 314. The state 314 may assign to the BLOCK3 a homogeneity value (e.g., N) and the method 300' terminates. If the neighbor BLOCK3 is qualified and homogeneous, the method 300' moves to the state 312. The state 312 may assign a homogeneity value H to the block.

Figure 14:
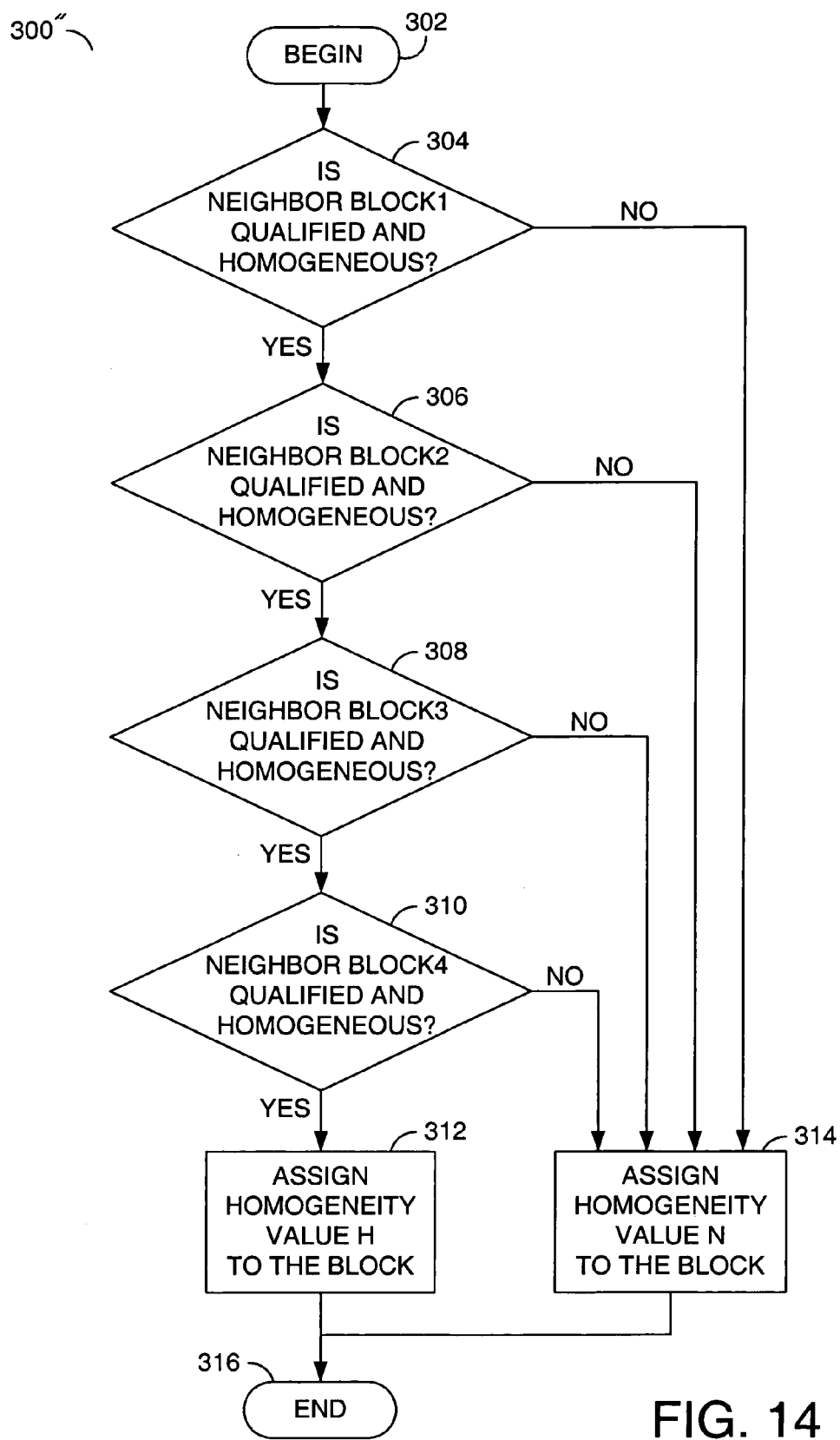
FIG. 14 is a flow diagram for detecting the homogeneity of a block using the all-neighboring inference method.

Referring to FIG. 14, a method 300" for detecting the homogeneity of a block using a four-neighbor inference system is shown. In the all-neighbor-inference method 300", a block is homogeneous if and only if all four neighboring blocks to the block are qualified and homogeneous. The method 300" generally comprises performing four sequential tests on the qualifications and the homogeneity of all four neighboring blocks of the block. If any of the four tests shows that a neighboring block is non-qualified or non-homogeneous, then the remaining tests (if any) are skipped and a homogeneity value (e.g., N) may be assigned to the particular block and the method 300" ends. If the four tests show that the four neighboring blocks are all qualified and all homogeneous, then a homogeneity value (e.g., H) may be assigned to the particular block and the method 300" ends.

The state 302 generally comprises a start state. The decision state 304 may determine if a neighbor BLOCK1 is qualified and homogeneous. If the neighbor BLOCK1 is not either qualified or homogeneous, the method 300" moves to the state 314. The state 314 may assign to the BLOCK1 a homogeneity value (e.g., N) and the method 300" terminates. If the neighbor BLOCK1 is qualified and homogeneous, the method 300" moves to the decision state 306. The decision state 306 may determine if a neighbor BLOCK2 is qualified and homogeneous. If the neighbor BLOCK2 is not either qualified or homogeneous, the method 300" moves to the state 314. The state 314 may assign to the BLOCK2 a homogeneity value (e.g., N) and the method 300" terminates. If the neighbor BLOCK2 is qualified and homogeneous, the method 300" moves to the state 308. The decision state 308 may determine if a neighbor BLOCK3 is qualified and homogeneous. If the neighbor block 3 is not either qualified or homogeneous, the method 300" moves to the state 134. The state 314 may assign the BLOCK3 a homogeneity value of (e.g., N) and the method 300' terminates. If the neighbor BLOCK3 is qualified and homogenous, the method 300" moves to the state 310. The decision state 310 may determine if a neighbor BLOCK4 is qualified and homogeneous. If the neighbor block 4 is not either qualified or homogenous, the method 300" moves to the state 314. The state 314 may assign the BLOCK4 a homogeneity value (e.g., N) and the method 300" terminates. If the neighbor BLOCK4 is qualified or homogeneous, the method 300" moves to the state 312. The state 312 assigns a homogeneity value (e.g., H) to the particular block.

In general, there may be six pairs of neighboring blocks positioned in relation to the particular block analyzed for homogeneity using the two-neighbor-inference method 300. The six pairs of neighbors may be (i) left neighbor and top neighbor, (ii) left neighbor and right neighbor, (iii) left neighbor and bottom neighbor, (iv) top neighbor and right neighbor, (v) top neighbor and bottom neighbor and (vi) right neighbor and bottom neighbor. There may be four triplets of neighboring blocks positioned for homogeneity detection using the three-neighbor-inference method 300'. The four triples of neighbors may be (i) left neighbor, top neighbor and right neighbor, (ii) neighbor, right neighbor and bottom neighbor, (iii) right neighbor, bottom neighbor and left neighbor, and (iv) bottom neighbor, left neighbor and top neighbor. All four neighboring blocks of a block are used in the four-neighbor-inference method 300".

In a two-neighbor-inference method 300, only one pair of neighbors is used for homogeneity detection. As shown in connection with FIG. 10, the method 300 may use BLOCK_A and BLOCK_B for detecting the homogeneity of BLOCK0. The method 300 may also use BLOCK_A and BLOCK_D for detecting the homogeneity of BLOCK0. Similarly, the method 300 may use BLOCK_B and BLOCK_C for detecting the homogeneity of BLOCK1. The method 300 may use BLOCK_C and BLOCK_D for detecting the homogeneity of BLOCK1. Also, as shown in connection with FIG. 11, the method 300 may use (i) BLOCK_A and BLOCK_B for detecting the homogeneity of BLOCK0, (ii) BLOCK_B and BLOCK_C for detecting the homogeneity of BLOCK1, (iii) BLOCK_C and BLOCK_D for detecting the homogeneity of BLOCK3, (iv) BLOCK_A and BLOCK_D for detecting the homogeneity of BLOCK2.

In the three-neighbor-inference method 300', only one triple of neighbors are used for homogeneity detection. As shown in connection with FIG. 9, the method 300' may use (i) BLOCK_A, BLOCK_B and BLOCK_C for detecting the homogeneity of BLOCK0; or (ii) BLOCK_B, BLOCK_C and BLOCK_D for detecting the homogeneity of BLOCK0, or (iii) BLOCK_C, BLOCK_D and BLOCK_A for detecting the homogeneity of BLOCK0, or (iv) BLOCK_D, BLOCK_A and BLOCK_B for detecting the homogeneity of BLOCK0. In the four-neighbor-inference method 300", all four neighboring blocks of a block are used for homogeneity detection.

In general, the present invention may choose to not use a neighboring block for homogeneity detection for reasons such as complexity and/or storage. For example, in a raster block scanning order, the use of the homogeneity information of a bottom neighbor that belongs to a block for homogeneity detection needs to store the information of a block row and may not be efficient.

Figure 15:
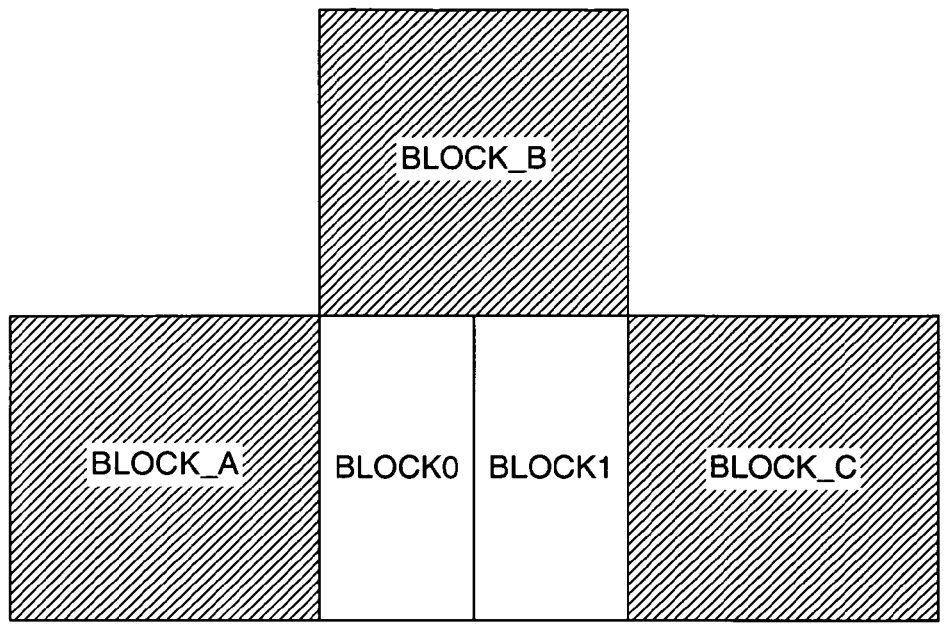
FIG. 15 is a diagram illustrating two blocks and a number of neighboring block in a fifth arrangement.

Referring to FIG. 15 a diagram illustrating two blocks to be analyzed (e.g., BLOCK0 and BLOCK1) and a number of blocks in a fifth arrangement is shown. FIG. 15 illustrates that the bottom neighboring blocks may not be available for homogeneity reference. The two-neighbor-inference method 300 may indicate that (i) BLOCK0 is homogeneous if a BLOCK_A and a BLOCK_B are both homogeneous or (ii) the BLOCK1 is homogeneous if the BLOCK_B and the BLOCK_C are both homogeneous.

Figure 16:
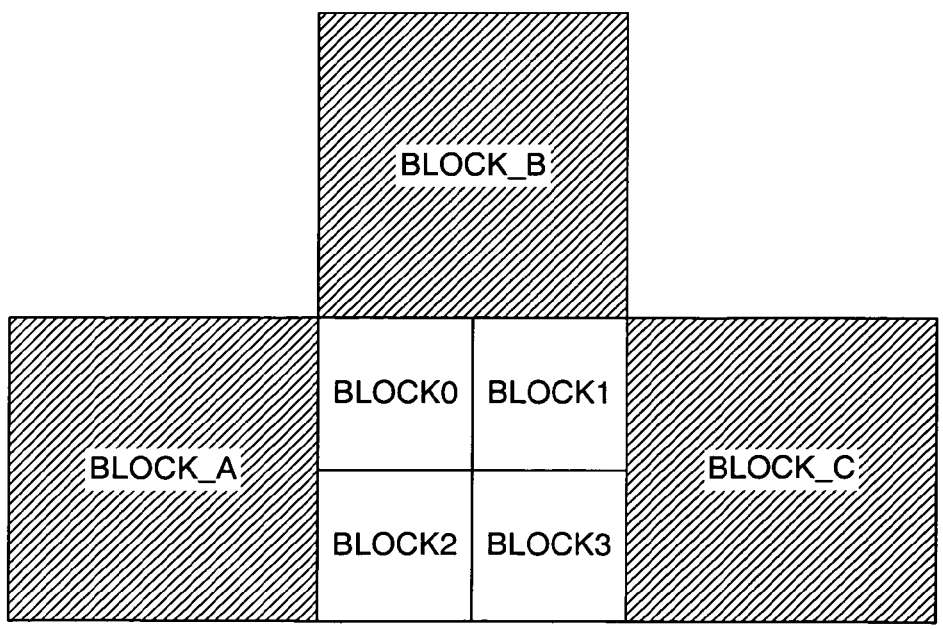
FIG. 16 is a diagram illustrating four blocks and a number of neighboring blocks in the fifth arrangement.

Referring to FIG. 16, a diagram illustrating four blocks to be analyzed (e.g., BLOCK0, BLOCK1, BLOCK2 and BLOCK3) and a number of blocks in a fifth arrangement is shown. FIG. 16 illustrates that the bottom neighboring blocks may not be available for homogeneity reference in certain instances. For example, if a BLOCK_A and BLOCK_B are both homogeneous, then a BLOCK0 is homogeneous. Further, since the BLOCK0 is the top neighbor of the BLOCK2, then the BLOCK2 is also homogeneous. In particular, if the BLOCK_A and the BLOCK_B are both homogeneous, then the BLOCK0 and the BLOCK2 are homogeneous. Similarly, if the BLOCK_B and the BLOCK_C are both homogeneous, then the BLOCK1 and the BLOCK3 are homogeneous.

Figure 17:
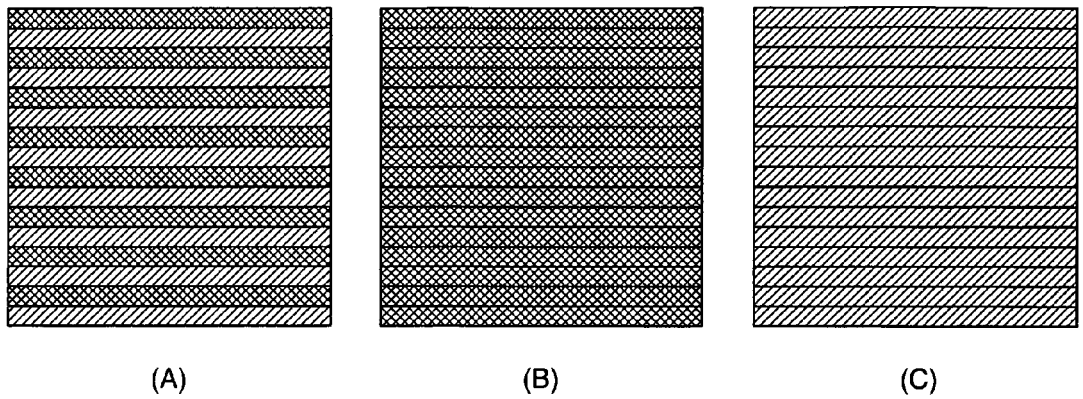
FIG. 17 is a diagram illustrating a frame based block and a field based block.

Referring to FIG. 17, a diagram illustrating a frame based block and a field based block is shown. For the interlaced image source, the structure of the blocks may be frame-based or field-based for image processing such as image/video coding. Field-based blocks may have data either from the top field or the bottom field. Frame-based blocks may be formed by interleaving data from the top field and the bottom field. The block (a) illustrates a frame-based block. The blocks (b) and (c) illustrate field based blocks. Generally, the block (a) interleaves data from a top field and the bottom field. The block (b) may be formed by the top field data and the block (c) may be formed by the bottom field data.

If the structure of the blocks in an image is block adaptive, then the blocks may be frame based or field based. The designation whether the blocks may be frame based or field based may be determined by applications such as frame/field adaptive encoding. If the structure of the blocks in an image is not block adaptive, then each block in the image may have the same structure (e.g., blocks in the image are either all frame based or all field based). If the structure of the blocks in an image is not block adaptive, the present invention may be applied to the interlaced image in the same way as the present invention may be applied to a progressive image. In general, if the structure of the blocks in an image is block adaptive, the structure of the neighboring blocks of a block may be determined by the present invention.

Figure 18:
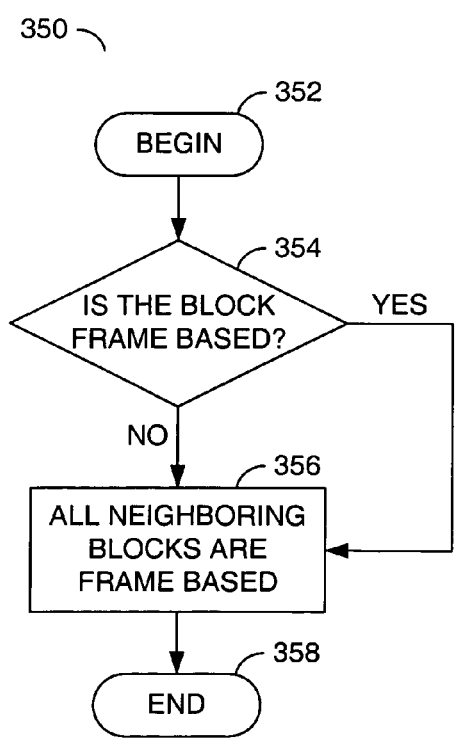
FIG. 18 is a flow diagram for detecting the block structure of the neighboring blocks using the frame-based-neighbor method.

Referring to FIG. 18, a method 350 for determining the block structure of the neighboring blocks using a frame-based-neighbor approach is shown. In the frame-based-neighbor method 350, the four neighboring blocks of the particular block being analyzed are generally all frame based, regardless of whether the particular block is frame based or field based. The method 350 illustrates that all neighboring blocks are frame based, which is independent of the structure of the particular block. The method 350 generally comprises a state (or step) 352, a decision state (or step) 354, a state (or step) 356, and a state 358. The state 352 generally comprises a start state. The decision state 354 may determine if the block is frame based. If the block is frame based, the method 350 moves to the state 356. If the block is not frame based, the method 350 moves to the state 356. The state 356 may designate all neighboring blocks as frame based.

Figure 19:
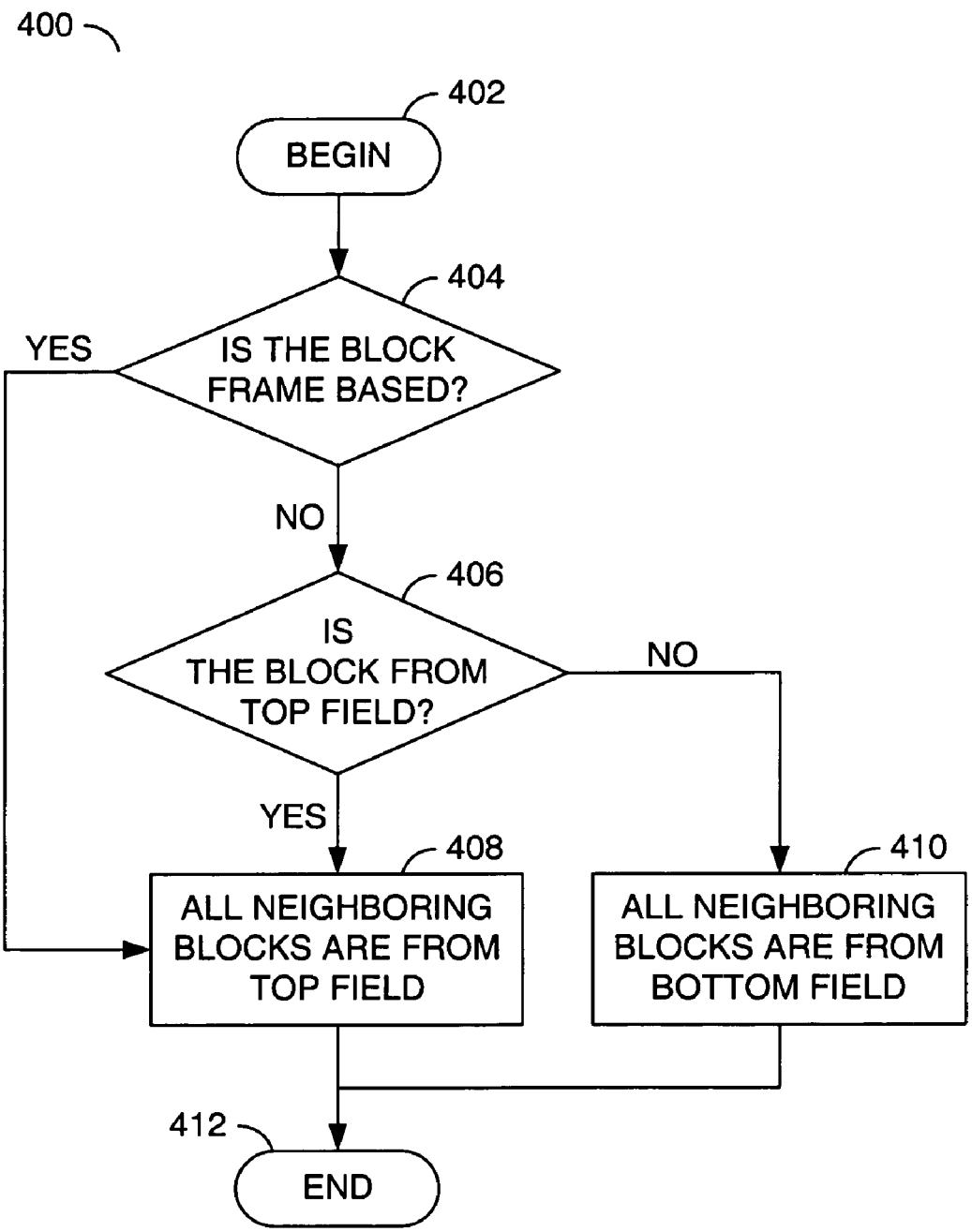
FIG. 19 is a flow diagram for determining the block structure of the neighboring blocks using the top-field-based-neighbor method.

Referring to FIG. 19, a method 400 for determining the block structure of the neighboring blocks using a top-field-based-neighbor approach is shown. In the top-field-based-neighbor method 400, the four neighboring blocks of a particular block being analyzed are all field based, regardless of whether the particular block is frame based or field based. If the particular block is frame based, the four neighboring blocks are formed by the top field data. If the particular block is field based, the neighboring blocks are all from the same field as the block. The method 400 generally comprises a state (or step) 402, a decision state (or step) 404, a decision state (or step) 406, a state (or step) 408, a state (or step) 410 and a state (or step) 412. The decision state 404 may determine if the particular block is frame based. If the block is frame based, the method 400 moves to the step 408. The state 408 marks all neighboring blocks as being from a top field. If the particular block is not frame based, the method 400 moves to the decision state 406. The decision state 406 may determine whether the particular block is from a top field. If the particular block is from a top field, the method 400 moves to the state 408. The state 408 marks all neighboring blocks as being from the top field. If the decision state 406 determines the particular block is not from a top field, the method 400 moves to the state 410. The state 410 marks that all neighboring blocks are from the bottom field.

Figure 20:
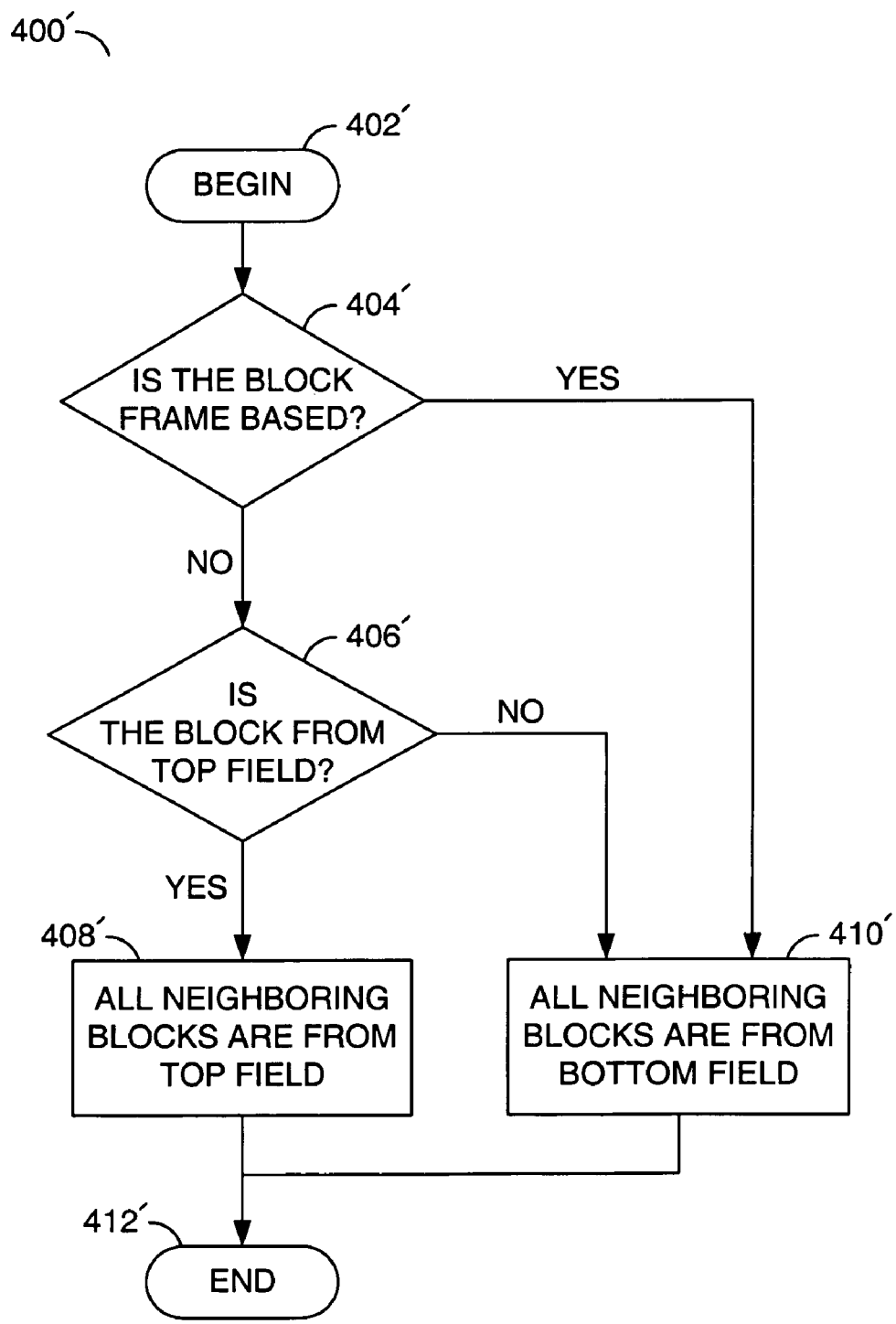
FIG. 20 is a flow diagram for determining the block structure of the neighboring blocks using the bottom-field-based-neighbor method.

Referring to FIG. 20, a method 400' for determining the block structure of the neighboring blocks using a bottom-field-based-neighbor approach is shown. In the bottom-field-based-neighbor method 400', the four neighboring blocks of the particular block are field based, regardless of whether the particular block is frame based or field based. If the particular block is frame based, the four neighboring blocks are formed by the bottom field data. If the particular block is field based, the neighboring blocks are from the same field as the particular block. The method 400' generally comprises a state 402', a decision state 404', a decision state 406', a state 408', a state 410' and a state 412'. The state 402' generally comprises a start state. The decision state 404' may determine if the particular block is frame based. If the particular block is frame based, the method 400' moves to the state 410'. The state 410' marks all of the neighboring blocks as being from the bottom field. If the decision state 404' determines that the block is not frame based, the method 400' moves to the decision state 406'. The decision state 406' may determine if the particular block is from a top field. If the block is not from a top field, the method 400' moves to the state 410'. If the decision state 406' determines that the particular block is from a top field, the method 400' moves to the state 408'. The state 408' marks all of the neighboring blocks as being from a top field.

Figure 21:
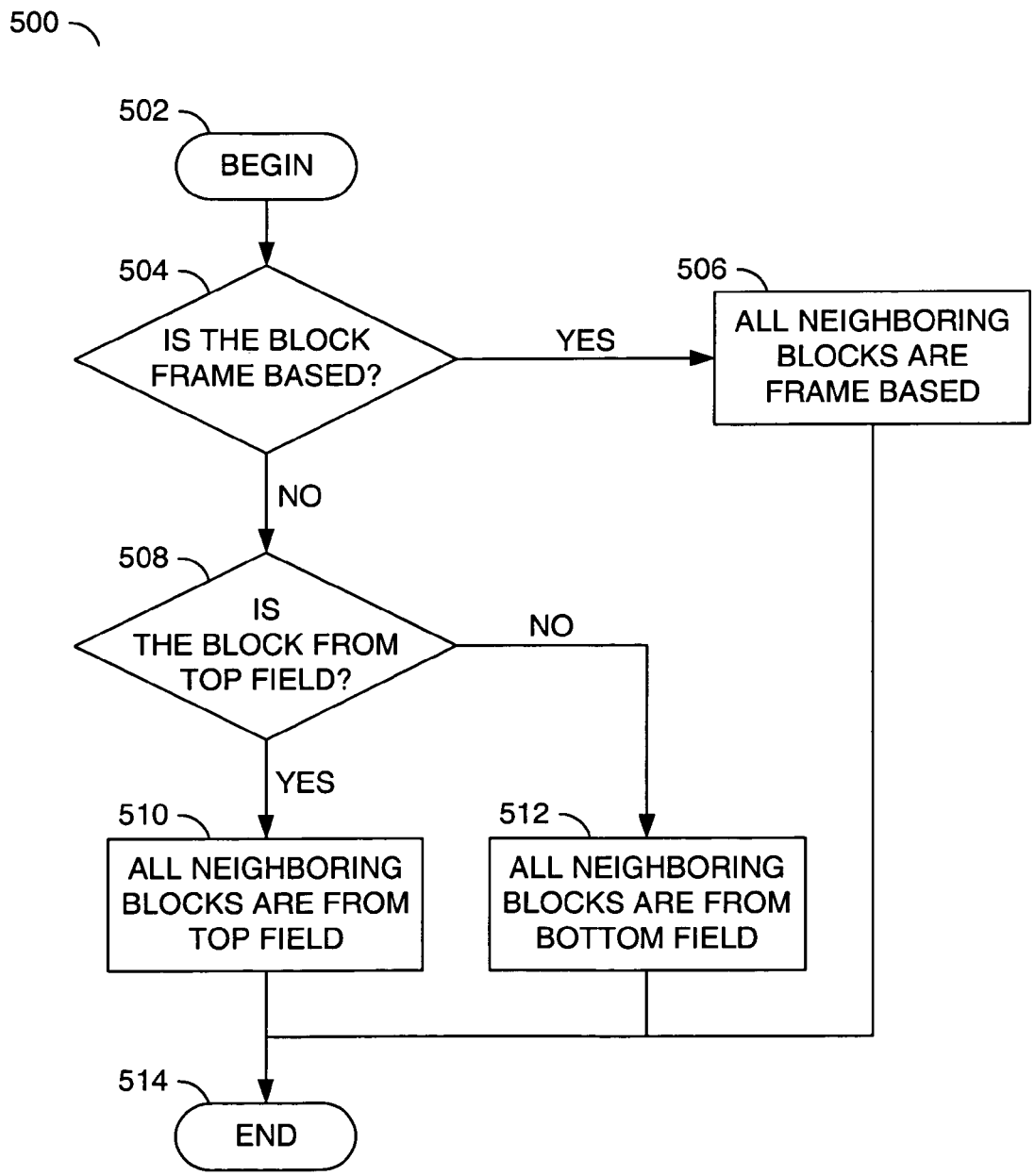
FIG. 21 is a flow diagram for determining the block structure of the neighboring blocks using the structure-adaptive-neighbor method.

Referring to FIG. 21, a method 500 for determining the block structure of the neighboring blocks using a structure-adaptive-neighbor approach is shown. In the structure-adaptive-neighbor method 500, the four neighboring blocks of a particular block being analyzed are frame based if the particular block is frame based. If the particular block is field based, the neighboring blocks are also field based and are from the same field as the block. The method 500 generally comprises a state (or step) 502, a decision state (or step) 504, a state (or step) 506, a decision state (or step) 508, a state (or step) 510, a state (or step) 512 and a state (or step) 514. The decision state 504 may determine if the particular block is frame based. If the particular block is frame based, the method 500 moves to the state 506. The state 506 marks all neighboring blocks as being frame based. If the decision state 504 determines that the particular block is not frame based, the method 500 moves to the decision state 508. The decision state 508 may determine whether the particular block is from a top field. If the particular block is from a top field, the method 500 moves to the state 510. The state 510 marks all neighboring blocks as being from the top field. If the decision state 508 determines that the particular block is not from a top field, the method 500 moves to the state 512. The state 512 marks all of the neighboring blocks as being from a bottom field.

The present invention may be based on inferences made from neighboring blocks. The inferences may be based on binary comparisons. Compared to conventional methods (which use direct detection with filtering) the present invention is generally simple and may use both software and hardware implementation.

A typical application of the present invention may involve Motion Estimation (ME) and Motion Compensation (MC) in H.264/AVC encoding, where the homogeneity of sub-MBs (8×8 blocks) of an Macro-Block (MB) (a 16×16 block) is used to reduce the block partitions of the sub-MBs for ME and MC. The small partitions 8×4, 4×8 and 4×4 may be disabled for a sub-MB if the sub-block is homogeneous. The homogeneity of the sub-MBs may be inferred from the homogeneity of four neighboring MBs.

Referring to FIG. 22, an example of four ways to partition a macroblock is shown. In H.264, a hierarchical block partition may be used for ME and MC. In a 16×16 partition, there may be only one partition which has size 16×16. In a 16×8 partition, there may be two partitions, each of which has size 16×8. In the 8×16 partition, there may be two partitions, each of which has size 8×16. In the 8×8 partition, there may be four partitions, each of which is called a sub-Mb and has size 8×8.

Referring to FIG. 23, an example illustrating how a sub-MB may be further partitioned in four different ways is shown. In the 8×8 partition, there may be only one partition which has size 8×8. In the 8×4 partition, there may be two partitions, each of which has size 8×4. In the 4×8 partition, there may be two partitions, each of which has size 4×8. In the 4×4 partition, there may be four partitions, each of which has size 4×4.

Therefore, there are generally seven block partitions in total (e.g., 16×16, 16×8, 8×16, 8×8, 8×4, 4×8, and 4×4) for ME and MC in H.264. The MB level partitions (e.g., 16×16, 16×8, 8×16, and 8×8) may be defined as large partitions. The MB level partitions (e.g., 8×4, 4×8 and 4×4) may be defined as small partitions. For computational efficiency, some partitions may be disabled for individual MBs, whereas the coding quality may drop slightly or not drop at all. At the MB level, the large partitions may be disabled. At the sub-MB level, the small partitions may be disabled.

Homogeneity has been used as a metric to reduce block partitions in the present invention. If an MB is homogeneous, the small partitions may be disabled for each of the four sub-MBs in the MB. Furthermore, based on the direction of the strongest edge, some large partitions may be disabled. If the strongest direction is horizontal, the partitions 8×16 and 8×8 may be disabled. If the strongest direction is vertical, the partitions 16×8 and 8×8 are disabled. If the strongest direction is diagonal, the partitions 8×16 and 16×8 may be disabled.

If the MB is non-homogeneous, the small partitions may be disabled for sub-MBs that are homogeneous.

A description of a program of disabling MB partitions is shown in the following TABLE 1:

TABLE 1

```
    enable partitions 16 × 16, 16 × 8, 8 × 16, 8 × 8, 8 × 4,
4 × 8, and 4 × 4
        if (MB is homogeneous)
            disable partitions 8 × 4, 4 × 8, and 4 × 4 for each
of the four sub-MBs of the MB
            if (strongest_direction == horizontal) disable
partitions 8 × 8 and 8 × 16
            else if (strongest_direction == vertical) disable
partitions 8 × 8 and 16 × 8
            else if (strongest_direction == diagonal) disable
partitions 16 × 8 and 8 × 16
        else
            loop over all four sub-MBs
            if (sub-MB is homogeneous)
                disable partitions 8 × 4, 4 × 8 and 4 × 4 for
the current sub-MB
```

The homogeneity of the neighboring blocks to a MB may be determined using a variety of approaches. For example, a direct method may be used that compares the edge strength of the MB to a specified threshold. If the strength is less than the specified threshold, the MB is homogeneous, otherwise the MB is non-homogeneous.

A description of a program for detecting the homogeneity of an MB is shown in the following TABLE 2:

TABLE 2

```
if ( edge_strength_currMB <= EDGETHOLD)
    CurrMB is homogeneous
else
    CurrMB is non-homogeneous
```

The signal EDGETHOLD (as illustrated in FIG. 2) is the threshold that is selected to control the homogeneity.

The homogeneity of a sub-MB may be determined using an indirect method which infers the homogeneity from the neighboring MBs of the MB. The indirect method may generally provide computational efficiencies over conventional methods. The indirect method is a special case of the present invention.

A description of a program for detecting the homogeneity the four sub-MBs in an MB, are illustrated in FIG. 16 is shown in the following TABLE 3:

TABLE 3

```
if ((BLOCK_A exists && BLOCK_A is homogeneous) &&
   (BLOCK_B exists && BLOCK_B is homogeneous ))
       BLOCK0 is homogeneous
       BLOCK2 is homogeneous
else
       BLOCK0 is non-homogeneous
       BLOCK2 is non-homogeneous
   if ((BLOCK_B exists && BLOCK_B is homogeneous) &&
   (BLOCK_C exists && BLOCK_C is homogeneous ))
       BLOCK1 is homogeneous
       BLOCK3 is homogeneous
else
       BLOCK1 is non-homogeneous
       BLOCK3 is non-homogeneous
```

BLOCK_A, BLOCK_B and BLOCK_C are defined as MBs, and BLOCK0, BLOCK1, BLOCK2, and BLOCK3 are defined as sub-MBs of an MB.

The function performed by the flow diagrams of FIGS. 4, 8, 12, 13, 14, 18, 19, 20 and 21 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
a first circuit configured to (i) receive an image data stream comprising a plurality of frames each having a plurality of regions, (ii) select a particular region to be marked as being homogeneous or not homogeneous, and (iii) determine whether a group of neighboring regions to said selected region are qualified or not qualified; and
a second circuit configured to mark said selected region as being homogeneous when one or more of said adjacent regions is (i) qualified and (ii) previously marked as being homogeneous.

2. The apparatus according to claim 1, wherein said second circuit marks said selected region in response to two or more of said adjacent regions being (i) qualified and (ii) previously marked as being homogeneous.

3. The apparatus according to claim 1, wherein said neighboring regions comprise one or more regions adjacent to said selected region within a particular frame.

4. The apparatus according to claim 1, wherein each of said regions comprises a block.

5. The apparatus according to claim 2, wherein said neighboring regions are located in any one of four positions in relation to said selected region.

6. The apparatus according to claim 1, wherein said neighboring regions comprise one or more blocks in the same location within consecutive frames.

7. The apparatus according to claim 1, wherein said neighboring regions comprise two or more regions in the same location within consecutive frames.

8. The apparatus according to claim 1, wherein said first circuit comprises a neighboring region qualifier circuit and said second circuit comprises a homogeneity inferrer.

9. The apparatus according to claim 8, wherein said homogeneity inferrer is configured to present a homogeneity value representing whether said selected region is homogeneous or non-homogeneous.

10. The apparatus according to claim 9, wherein said homogeneity value (i) is equal to one if said selected region is homogeneous and (ii) is equal to zero if said selected region is non-homogeneous.

11. The apparatus according to claim 1, wherein the said image data is interlaced.

12. The apparatus according to claim 11, wherein the structure of said selected region is adaptive to be either frame based or field based.

13. The apparatus according to claim 11, wherein said neighboring regions are frame based.

14. The apparatus according to claim 12, wherein (i) said neighboring regions are all from a top field or (ii) a selected number of neighboring regions are all from a bottom field.

15. The apparatus according to claim 11, wherein:
a structure of said selected region is not adaptive; and
a selected number of neighboring regions have a similar structure to said selected region.

16. The apparatus according to claim 1, wherein said selected region and said neighboring regions are non-rectangular.

17. An apparatus comprising:
a first circuit configured to (i) receive an image data stream comprising a plurality of frames, where each frame comprises a plurality of regions, where each region comprises a plurality of pixels, (ii) select a particular region to be marked as being homogeneous or not homogeneous, and (iii) determine whether a group of neighboring regions to said selected region are qualified or not qualified; and
a second circuit configured to mark said selected region as being homogeneous when one or more of said neighboring regions are (i) qualified and (ii) previously marked as being homogeneous.

18. A method for determining homogeneity of a selected block of an image data stream comprising a plurality of frames each having a plurality of blocks, comprising steps of:
(A) receiving said image data stream in an image processing system and identifying a selected number of neighboring blocks in relation to said selected block of said image data stream;
(B) determining which of said selected number of neighboring blocks are qualified neighboring blocks;

(C) determining which of said selected number of neighboring blocks are homogeneous; and (D) setting a homogeneity flag value associated with the selected block to (i) a first state marking the selected block as homogeneous in response to one or more of said selected number of neighboring blocks being both qualified and previously marked as being homogeneous and (ii) a second state marking the selected block as non-homogeneous in response to all of said selected number of neighboring blocks not being both qualified and previously marked as being homogeneous.

19. The method according to claim 18, wherein step (A) further comprises the step of:
identifying two neighboring blocks in relation to said selected block; and
determining a position of said two neighboring blocks as any one of six positions in relation to said selected block.

* * * * *